United States Patent [19]

Fouts

[11] Patent Number: 4,736,969
[45] Date of Patent: Apr. 12, 1988

[54] FITTING ASSEMBLY FOR REINFORCED HOSE

[75] Inventor: Robert E. Fouts, Rancho Palos Verdes, Calif.

[73] Assignee: Earl's Supply Co., Carson, Calif.

[21] Appl. No.: 917,298

[22] Filed: Oct. 9, 1986

Related U.S. Application Data

[63] Continuation of Ser. No. 663,427, Oct. 22, 1984, abandoned.

[51] Int. Cl.$^4$ ............................................. F16L 33/01
[52] U.S. Cl. ..................... 285/247; 285/149; 285/250; 285/259; 285/245
[58] Field of Search ............... 285/245, 246, 247, 259, 285/250, 149

[56] References Cited

U.S. PATENT DOCUMENTS

| | | | |
|---|---|---|---|
| 476,752 | 6/1892 | Lenty | 285/247 |
| 773,965 | 11/1904 | McIntyre | 285/259 |
| 1,006,671 | 10/1911 | Myer | 285/247 |
| 1,089,650 | 3/1914 | Kile | 285/245 |
| 1,198,814 | 9/1916 | Banfil | 285/245 |
| 1,233,401 | 7/1917 | Reeve | 285/247 |
| 1,486,421 | 3/1920 | Dyer | 285/259 |
| 2,731,279 | 1/1956 | Main | 285/247 |
| 2,865,094 | 12/1958 | Press | 285/259 |
| 2,974,980 | 3/1961 | Boyle | 285/247 |
| 3,820,825 | 6/1974 | Morin | 285/247 |
| 4,437,689 | 3/1984 | Goebel et al. | 285/259 |

FOREIGN PATENT DOCUMENTS

| | | | |
|---|---|---|---|
| 646926 | 8/1962 | Canada | 285/247 |
| 664707 | 9/1929 | France | 285/245 |
| 990553 | 9/1951 | France | 285/242 |
| 1108195 | 1/1956 | France | 285/247 |
| 327381 | 7/1936 | Italy | 285/247 |
| 402527 | 12/1945 | Italy | 285/247 |
| 97556 | 4/1961 | Netherlands | 285/247 |
| 49262 | 3/1965 | Poland | 285/247 |
| 1349941 | 4/1974 | United Kingdom | 285/259 |

Primary Examiner—Gary L. Smith
Assistant Examiner—Eric K. Nicholson
Attorney, Agent, or Firm—Poms, Smith, Lande & Rose

[57] ABSTRACT

A fitting assembly for a hose comprising a nipple having a plurality of spaced separate annular barbs thereon adapted to dig into the internal wall of a hose and threads remote from said barbs for coupling the nipple to a socket. A socket is provided which includes internal threads for threading engagement to the threads on said nipple and spaced internal annular teeth adapted to bite or dig into the outer wall of a hose thereby crushing and clamping a hose between the barbs and teeth and filling the space between the nipple and socket adjacent the barbs and teeth when the socket is threaded to said nipple. In this manner, the socket is retained to the nipple separate from the seal provided between the nipple, socket and hose and oil cannot leak past the barbs and teeth.

1 Claim, 2 Drawing Sheets

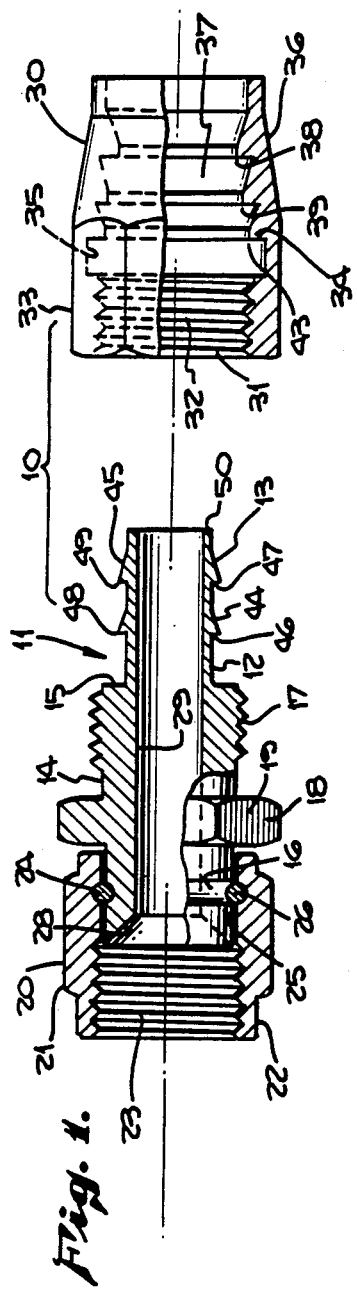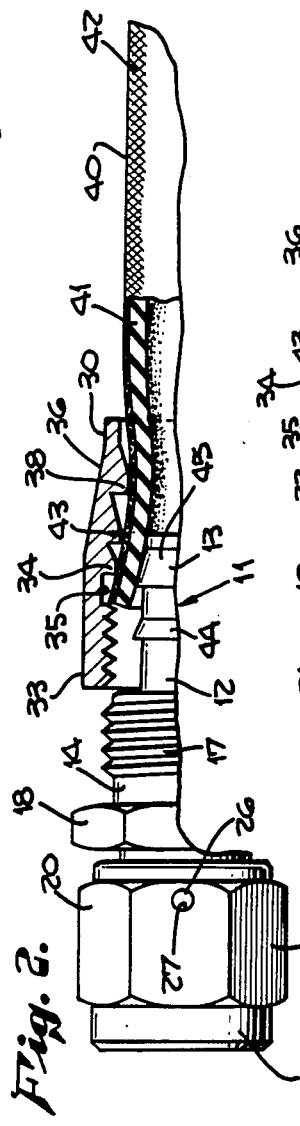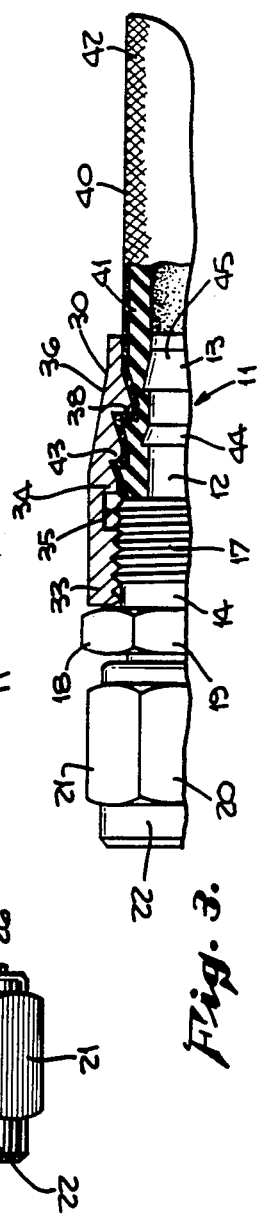

FITTING ASSEMBLY FOR REINFORCED HOSE

This is a continuation of co-pending application Ser. No. 663,427 filed on Oct. 22, 1984 now abandoned.

BACKGROUND OF THE INVENTION

1. Field of the Invention

The invention relates to hose assemblies, and, more particularly, to an assembly for coupling a hose to a fitting in a fluid tight manner.

2. Description of the Prior Art

Numerous hose and fitting assemblies are disclosed in the prior art. These assemblies are used to provide a fluid tight seal between a hose and a fitting. Where the hose fitting assembly is of the swivel or elbow type, such sealing relationship may be destroyed if the nipple is rotated relative to the hose after assembly.

Certain prior art fittings use threaded nipples inserted into a hose where oil can flow along the spiral threads of the nipple and out of the fittings. For example, in U.S. Pat. No. 476,752 to Lenty, oil can flow from hose 17a through the grooves 19 since no seal is provided between the hose and the grooved end of nipple 20. In U.S. Pat. No. 1,006,671 to Myer, the nipple 7 has a spiral 16 and oil can flow out of hose 15 about the spiral. In U.S. Pat. No. 1,233,401 to Reeve, annular ridges on nipple b are rounded and rest in ridges g. They do not create an effective seal since they do not bite or dig into the hose and must be seated properly to seal at all.

U.S. Pat. No. 1,089,650 to Kile shows a nipple having serrations or teeth 9 but there are no teeth on the sleeve wall so that leakage can take place between the outer surface of the hose and the inner wall of fitting 19.

U.S. Pat. No. 1,486,421 to Dyer shows corrugations 27 on core 12 which are forced into hose 10 but a substantial leakage path is formed about these corrugations.

It is desirable to have a fitting with a single nipple hose end which both seals and retains the nipple to the socket and yet assigns these responsibilities to separate design features.

SUMMARY OF THE INVENTION

It is an object of this invention to provide an improved hose end fitting which is usable with known hose and sockets.

It is a further object of this invention to provide a sealed fitting for stainless steel braided hose which has improved sealing.

It is still further an object of this invention to provide a fitting having a single nipple which provides both the seal and the retention of the fitting to the socket on the hose end using separate design features.

These and other objects are preferably accomplished by providing a fitting assembly for a hose comprising a nipple having a plurality of spaced separate annular barbs thereon adapted to dig into the internal wall of a hose and threads remote from said barbs for coupling the nipple to a socket. A socket is provided which includes internal threads for threading engagement to the threads on said nipple and spaced internal annular teeth adapted to bite or dig into the outer wall of a hose thereby crusing and clamping a hose between the barbs and teeth and filling the space between the nipple and socket adjacent the barbs and teeth when the socket is threaded to said nipple. In this manner, the socket is retained to the nipple separate from the seal provided between the nipple, socket and hose and oil cannot leak past the barbs and teeth.

BRIEF DESCRIPTION OF THE DRAWING

FIG. 1 is an exploded view of a fitting assembly in accordance with the invention;

FIG. 2 is a view of the fitting of the assembly of FIG. 1 having a hose coupled thereto;

FIG. 3 is a partial cross-sectional view of the final assembly of the assembly of FIG. 1 to a hose.

DESCRIPTION OF THE PREFERRED EMBODIMENT

Figure 4:
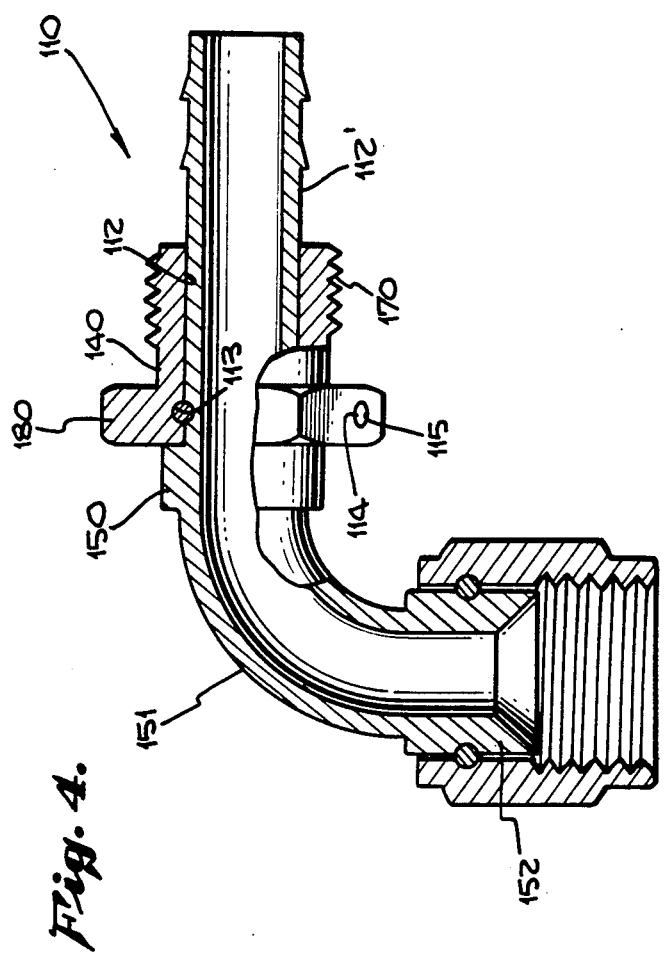
FIG. 4 is a view similar to a portion of the view of FIG. 1 showing a modification thereof.

Referring now to FIG. 1 of the drawing, a sealed fitting 10 for reinforced hose, such as stainless steel braided hose, commonly referred to as a fitting assembly, is shown in exploded view. This assembly is adapted for use with reinforced hose, such as hose 40 in FIG. 2, which hose generally comprises an inner fluid sealing tube 41 of rubber or elastomeric or similar material and an outer tubular reinforcement 42 of conventional wire braided construction, such as stainless steel braid. The fitting 10 includes a nipple construction 11 of generally cylindrical construction, including an elongated substantially cylindrical portion 12 terminating at an enlarged end 13. The nipple 11 further comprises an integral enlarged portion 14 having an outer diameter greater than the outer diameter of cylindrical portion 12 with the same internal diameter. A shoulder 15 is provided at the intersection of portions 12 and 14. An annular recess 16 is provided on portion 14 for receiving a connecting wire therein as will be discussed. External threads 17 are provided on the exterior of portion 14 and an enlarged nut 18 having hexagonal flats 19 thereon (See FIG. 3) is integral with portion 14.

A coupling member 20 is coupled to nipple 11 and includes hexagonal flats 21 (FIG. 3) on its outer surface and an integral smooth walled terminal cylindrical portion 22. Member 20 is internally threaded at threads 23 and includes an annular recess 24 on its inner smooth wall 25 receiving therein and in recess 16 an annular connector wire 26 terminating out of opening 27 in member 20 (FIG. 2) as is well known in the art for retaining coupling member 20 to nipple 11. A tapered inner smooth walled portion 28 extends from the inner smooth wall portion 29 of nipple 11 to threads 23. In this manner, coupling member 20 swivels or rotates with respect to nipple 11 and can be coupled, via threads 23, to a threaded connection.

Fitting 10 further includes a socket 30 having a forward internally threaded section 31 including threads 32 for mating engagement with threads 17 of nipple 11. The exterior surface of the forward internally threaded section 31 forms a conventional hexagonal nut 33 (see also FIG. 3) so that the socket 30 may be tightened relative to nipple 11. The socket 30 further includes an intermediate section 34 which, when the socket 30 is threaded onto the nipple 11 as shown in FIG. 3, defines an annular space 35 (See also FIG. 3) between the exterior surface of the nipple 11, adjacent threads 17, when assembled as in FIG. 3, and the internal surface of section 34 of socket 30. Finally, socket 30 includes an axially rearwardly decreasing diameter section 36 which includes means 37 in the form of teeth 38, 39 and 43 for digging into the outer tubular reinforcement of the hose 40 as will be discussed further. These teeth vary in internal diameter so that teeth 38 are smaller in diameter than teeth 43. As seen in FIGS. 1 and 3, these teeth are preferably jagged.

A particularly contemplated in the present invention, nipple 11 includes independent sealing means and retention means thereon. Referring again to FIG. 1, retention means is provided on nipple 11 by threads 17 thereon which are adapted to threadably engage teeth 32 on socket 30. Independent of such retention means, sealing means on nipple 11 is provided by a pair of spaced barbs 44, 45 at the terminal end of cylindrical portion 12. These barbs 44, 45 are frusto-conically shaped integral portions of portion 12, barb 44 being spaced from barb 45, each barb 44, 45 having a shoulder 46, 47, respectively, forming a sharp peripheral edge 48, 49, respectively. Barb 45 is provided on the end 13 tapering to a front terminal edge 50.

A shown in FIG. 2, the fitting 10 is assembled to hose 40 by first placing socket 30 over the end of the hose so that the nipple 11 can be inserted into the forward end of the hose 40. As seen in FIG. 2, end 13 of nipple 11 enters internally of hose 40 with hose 40 extending to threads 17. Socket 30 can now be moved along hose 40 until threads 32 engage threads 17. Rotation of socket 30 on threads 17 secures the socket 30 to nipple 11. The final assembled position of socket 30 is shown in FIG. 3.

As socket 30 is rotated, it crushes the hose 40 between barbs 44, 45 on nipple 11 and teeth 38, 39 and 43 on socket 30. The sharp edges of the barbs and teeth dig into and crush the hose 40. The hose 40 fills the entire space between the internal surface of socket 30 adjacent teeth 38, 39 and 43 and the outer surface of nipple 11 adjacent barbs 44, 45 and the spacing between the teeth and barbs. Since barbs 44, 45 and teeth 38, 39 and 43 are annular and, since the crushed hose 40 fills the entire spacing between the socket 30 and nipple 11, oil cannot flow past the barbs.

Instead of being comprised of integral parts 11, 14, 18 as shown in FIG. 1, these parts may be independent components as illustrated in FIG. 4 wherein like numerals refer to like parts of the parts of FIG. 1. Thus, nipple 110 has at the end an annular recess 112 provided on nut portion 140, which is a separable element formed of threads 170 and nut 180. A like recess 113 is provided on portion 112' (which is similar to portion 12 of FIG. 1 but extends through nut portion 140) for receiving a wire 114 therein as is well known in the art. The terminal end of wire 114 extends to hole 115 in nut 180 as shown. Portion 112' has an integral shoulder or flange 150 with an elbow 151 integral therewith and extending therefrom to portion 152 which is otherwise identical to that portion of nut portion 14 in FIG. 1. Thus, nut portion 140 can rotate or swivel with respect to cylindrical portion 112' and is particularly suited to certain applications. Portion 20 can also swivel or twist so that the hose can be oriented any way desired.

It can be seen that I have disclosed a fitting having a single nipple having thereon means for sealing the nipple to a hose and means for retaining the nipple to a socket, both means being independent of the other. The nipple is held to the socket by mating threads and crushing of the hose between the nipple and the teeth of the socket. The seal is created by crushing the hose between barbs carried by the nipple and teeth carried by the socket.

The fitting herein has many advantages over known prior art fittings. Since the seal is not part of the retention means, it will not leak in the manner of such devices. The dimensions of fitting 10 may of course vary to accommodate hoses of differing sizes and may be made of any suitable materials, such as aluminum, stainless steel, etc. Since the hose is actually crushed between the socket and nipple, it will not blow off in high pressure applications. The socket and nipple can of course be disassembled from the hose and reused on another hose, if desired.

I claim:

1. In a hose and fitting assembly, the hose having an inner fluid sealing tube of resilient material and an outer tubular reinforcement of braided wire, the assembly which comprises:

a nipple having an elongated substantially cylindrical portion received inside of the fluid sealing tube, a threaded portion on said nipple remote from said cylindrical portion of larger diameter than said cylindrical portion, at least a pair of annular spaced barbs on said cylindrical portion, each barb being independent of the other and each barb having a sharp peripheral annular point thereon spaced from the sharp peripheral annular point of the adjacent barb for digging into the inner resilient wall of said tube, said barbs being frustoconically shaped tapering rearwardly from the forward leading end of said nipple to the threaded portion thereof; and a socket having an internally threaded section adjacent one end thereof for threaded engagement with the threaded portion of said nipple, an intermediate section on said socket having a plurality of annular teeth on the inner wall thereof, said teeth being spaced and independently separated from each other and also spaced from said internally threaded section and having sharp pointed annular terminal ends spaced from and separate from an adjacent sharp pointed annular terminal end for digging into the outer tubular braided wire reinforcement of said hose 40, at least three such teeth being provided, each of said teeth being triangular in cross section, the first of such teeth being adjacent the threaded section of said socket 30 and being substantially greater in inner diameter than the inner diameter of the next set of teeth, the next set of teeth being substantially greater in inner diameter than the final set of teeth, whereby, when said socket, having said hose extending therethrough and said nipple extending into one end of said hose, is threaded onto said nipple, said teeth and said barbs dig into and crush said hose between the outer surface of said nipple and the inner surface of said socket forcing said crushed hose into the entire space between said nipple and said socket forming a leak-proof path and filling the entire space between said nipple and said socket so that oil cannot flow therepast.

* * * * *